(12) United States Patent
Ng (10) Patent No.: US 10,686,536 B2
(45) Date of Patent: Jun. 16, 2020

(54) TESTING BASE STATIONS THAT SUPPORT MULTIPLE CARRIERS AND NARROWBAND INTERNET OF THINGS SIGNALS

(71) Applicant: Alcatel Lucent, Nozay (FR)

(72) Inventor: Man Hung Ng, Bristol Avon (GB)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/311,516

(22) PCT Filed: Jun. 15, 2017

(86) PCT No.: PCT/EP2017/064687
§ 371 (c)(1),
(2) Date: Dec. 19, 2018

(87) PCT Pub. No.: WO2017/220427
PCT Pub. Date: Dec. 28, 2017

(65) Prior Publication Data
US 2019/0334632 A1    Oct. 31, 2019

(30) Foreign Application Priority Data

Jun. 21, 2016    (EP) .................................... 16305749

(51) Int. Cl.
*H04B 17/00*    (2015.01)
*H04B 17/29*    (2015.01)
(Continued)

(52) U.S. Cl.
CPC ......... *H04B 17/0085* (2013.01); *H04B 17/29* (2015.01); *H04B 17/354* (2015.01);
(Continued)

(58) Field of Classification Search
CPC .. H04B 17/0085; H04B 17/354; H04B 17/29; H04B 7/08; H04B 17/00; H04B 7/06;
(Continued)

(56) References Cited

U.S. PATENT DOCUMENTS 9,100,862 B2 *    8/2015    Matsumoto ........ H04B 17/0085
9,801,115 B2 *    10/2017    Sadek ................... H04L 5/0073
(Continued)

FOREIGN PATENT DOCUMENTS

WO    WO 2016/055249 A1    4/2016

OTHER PUBLICATIONS

"3$^{rd}$ Generation Partnership Project; Technical Specification Group Radio Access Networks; Narrowband Internet of Things (NB-IoT); Technical Report for BS and UE radio transmission and reception (Release 13)," 3GPP TR 36.802 V1.0.0, pp. 1-59, XP051123388, (Jun. 2016).

(Continued)

*Primary Examiner* — Brian T O Connor
(74) *Attorney, Agent, or Firm* — Fay Sharpe LLP (57) ABSTRACT

A method, device and computer program for generating wireless signals for testing a network node for transmitting Narrow Band Internet of Things signals, for compliance with predetermined criteria, the network node being configured to support multiple carriers and to support operation within at least one radio frequency bandwidth. The method comprises: controlling a wireless signal generator to generate one test signal in a frequency band towards one edge of one of the at least one radio frequency bandwidth and one further test signal in a frequency band towards the other edge of the same one of the at least one radio frequency bandwidth, the one test signal comprising a Narrowband Internet of Things test signal.

22 Claims, 5 Drawing Sheets

(51) Int. Cl.
   *H04B 17/354* (2015.01)
   *H04W 72/04* (2009.01)
   *H04B 17/20* (2015.01)
   *H04B 7/06* (2006.01)
   *H04W 16/28* (2009.01)
   *H04B 7/08* (2006.01)

(52) U.S. Cl.
   CPC .......... *H04W 72/0453* (2013.01); *H04B 7/06* (2013.01); *H04B 7/08* (2013.01); *H04B 17/00* (2013.01); *H04B 17/20* (2015.01); *H04W 16/28* (2013.01)

(58) Field of Classification Search
   CPC ... H04B 17/20; H04B 17/15; H04W 72/0453; H04W 16/28
   See application file for complete search history.

(56) References Cited

U.S. PATENT DOCUMENTS 9,917,658 B2 * 3/2018 Hu ........................... H04B 7/06
2014/0242919 A1 * 8/2014 Matsumoto ........... H04W 24/06
                                                    455/67.14
2016/0323885 A1 * 11/2016 Kazmi .................... H04L 5/143
2017/0331670 A1 * 11/2017 Parkvall ............ H04W 52/0245

OTHER PUBLICATIONS

Ericsson, "BS RF ACS and Narrow band blocking requirements," 3rd Generation Partnership Project (3GPP), 3GPP TSG-RAN WG4 Meeting #78b, R4-162102, 6 pages, XP051084009, San Jose del Cabo, Mexico, Apr. 11-15, 2016.

Ericsson, "NB IoT BS RF core requirements update," 3rd Generation Partnership Project (3GPP), 3GPP TSG-RAN WG4 Meeting #78, R4-160918, 5 pages, XP051057243, Malta, Feb. 15-19, 2016.

Ericsson et al., "CR to TS36.104 for NB-to-IoT feature introduction," 3rd Generation Partnership Project (3GPP), 3GPP TSG-WG4 Meeting #79, R4-164452, 184 pages, China, Nanjing, May 23-27, 2016.

International Search Report for PCT/EP2017/064687 dated Sep. 12, 2017.

* cited by examiner

TESTING BASE STATIONS THAT SUPPORT MULTIPLE CARRIERS AND NARROWBAND INTERNET OF THINGS SIGNALS

FIELD OF THE INVENTION

The invention relates to the field of wireless communication networks and in particular to the testing of network nodes or bases stations operable to support both multiple carriers and Narrowband Internet of Things signals.

BACKGROUND

Narrowband Internet of Things (NB-IoT) is a technology that is being developed that will allow signals to be transmitted across different spectra. The focus is on indoor coverage, long battery life, low cost and many devices, hence the use of narrowband signals and the choice to allow these signals to be transmitted across several different existing spectra.

It is envisaged that these signals will be sent either in-band when the signals will use the resource blocks within a normal E-UTRA (evolved universal terrestrial radio access) carrier, in a guard band operation where the signals will be transmitted in the guard band of the E-UTRA carrier, or in a standalone operation when they will use their "own" spectrum, for example the spectrum currently being used by GERAN (GSM edge radio access network) systems as a replacement of one or more GSM (global system for mobile communication) carriers, as well as scattered spectrum for potential IoT deployment.

Wireless communication equipment is operated in a network of multiple communicating devices and is therefore designed to satisfy various interference requirements and in particular, to satisfy a requirement which sets an upper limit on the adjacent channel leakage ratio (ACLR) in order that leakage from one wireless communication channel should not reduce the capacity or throughput of another wireless communication channel by more than a certain amount, say 5%. Prior to sale and/or deployment a base station or network node should be compliance tested to ensure that the wireless communication equipment satisfies these emission requirements. Further tests on whether a receiver is able to successfully receive signals should also be performed.

Although different tests can be applied to the network nodes it would be desirable to provide a set of standardised test configurations (TC) that provide a reliable test that could be be used for such network nodes providing uniformity of approach.

SUMMARY

A first aspect of the present invention provides a method of generating wireless signals for testing a network node for transmitting Narrow Band Internet of Things signals, for compliance with predetermined criteria, said network node being configured to support multiple carriers and to support operation within at least one radio frequency bandwidth, said method comprising: controlling a wireless signal generator to generate one test signal in a frequency band towards one edge of one of said at least one radio frequency bandwidth and one further test signal in a frequency band towards the other edge of said same one of said at least one radio frequency bandwidth, said one test signal comprising a Narrowband Internet of Things test signal.

The inventor of the present invention recognised that when testing a network node, in order to limit the number of test signals used it would be desirable to use test signals that provide challenging test conditions. Furthermore, Narrowband Internet of things signals are not limited to a particular radio spectrum and as such may be transmitted across the radio frequency bandwidth of a network node that supports multiple carriers. Thus, when testing for compliance of the network node for transmitting these signals it is not sufficient to test each individual carrier. The inventor recognised that signals transmitted close to an edge of the radio frequency bandwidth are more challenging for the network node to both transmit and receive while still meeting required compliance criteria. In the transmission bandwidth signals towards the edge create potential problems with leakage to neighbouring channels while in the reception bandwidth the characteristics of the receiver filter may be an issue towards the edge of the bandwidth supported by the network node.

Thus, where a testing regime is desired that is both rigorous and not too onerous using a testing configuration algorithm which generates challenging signals is advantageous. Thus, the inventor selected test signals towards either edge of the whole radio frequency bandwidth of the network node in the realisation that were the criteria to be met for these signals then it is likely that it will be met for most possible operating conditions.

It should be noted that a signal towards an edge of the radio frequency bandwidth may be ones at an outermost location within a communication portion of said bandwidth or they may be ones in a guard band or they may be ones offset from the edge of the radio frequency bandwidth by some small amount. In all cases they are signals within a frequency range that forms the outermost 10%, preferably 5% of the radio frequency bandwidth.

At least one of the test signals is an Internet of Things test signal, that is a test signal that has a same configuration/coding and bandwidth as any other Narrowband Internet of Things signal. Such a signal will mimic such signals and provide an indication as to whether the transmission or reception of such signals meet the required criteria or not. Thus, the test signal may be coded using OFDM (orthogonal frequency division multiplexing) and will have bandwidth of 180 KHz.

The network node supports multiple carriers and each are transmitted or received on a particular channel having a certain frequency bandwidth reserved for that channel. These carriers are all transmitted or received within respectively the transmission or reception radio frequency bandwidth of the base station which each encompass all of the respective channels. NB IoT signals are not limited to a particular carrier but may be located at any point within the bandwidth. Thus, testing these signals towards an edge mimics a real signal albeit a challenging one.

In some embodiments, said one further test signal comprises one of a Narrowband Internet of Things test signal and a test signal comprising a physical resource block of one of said plurality of carriers.

There are two test signals located towards either edge of the radio frequency bandwidth. In some cases they may both be NB IoT signals, and in this case the issues arising from such signals at either edge of the bandwidth can be tested. In other cases one of the test signals is a NB IoT signal while the other is a test signal of one of the carriers supported by the base station located towards that edge of the radio frequency bandwidth. It is recognised that the base station supports multiple carriers as well as NB IoT signals. Thus, testing NB IoT signals in conjunction with a test signal that mimics a signal transmitted by said base station, from one of the carriers provides an indication of problems arising due to interference such as intermodulation distortion between the signals and also shows how each signal affects the network node's compliance with the required criteria.

In some embodiments, said at least one radio frequency bandwidth comprises a communication bandwidth and a guard bandwidth at either edge of said communication bandwidth and said frequency band towards an edge of said radio frequency bandwidth is within one of said guard bands.

In some cases a radio frequency bandwidth supported by a network node may have a guard band at its edge in which it does not generally transmit signals, or not signals of the carriers that it supports in order to reduce leakage into other neighbouring spectra. NB IoT signals can be transmitted across the radio frequency bandwidth and in some cases this includes the guard band. Furthermore as noted previously testing worst case scenarios allows the number of test cases to be reduced. Thus, placing the test signal in particular, the NB IoT signal(s) in the guard band provides an effective test of the compliance of the network with the predetermined criteria.

In some embodiments, said one of said test signals and said further one of said test signals are each within a different one of said guard bands.

Although in some cases only one of the test signals may be in one of the guard bands while the other may be within the communication band towards the other edge, in other cases both test signals may be located in each of the guard bands. In such a case the test signals may both be NB IoT signals.

In other embodiments, said at least one radio frequency bandwidth comprises a communication bandwidth and a guard bandwidth at either side of said communication bandwidth, and at least one of said test signals is in a frequency band towards at least one edge of said communication bandwidth.

Although placing the test signal in a guard band provides a good worst case scenario in other embodiments, it may be preferable to limit at least one of the test signals to being located within the communication bandwidth. Such a testing configuration may be suitable for circumstances where the network node does not support transmission of such signals within the guard band.

In some embodiments said frequency band towards said at least one edge of said communication bandwidth corresponds to an outermost location for a physical resource block in said communication bandwidth.

The location of the test signal towards an edge of the communication bandwidth may be at the outermost location for a physical resource block in that communication bandwidth. This may be right at the edge, or it may be offset from the edge due to raster, or some intentional offset.

Additionally and/or alternatively in some embodiments, the method further comprises generating a further test signal, said further test signal comprising one or more physical resource block(s) of a carrier supported by said base station at a location towards a centre of said at least one radio frequency bandwidth.

As noted previously intermodulation distortions and general interference between signals may affect whether or not the network node meets predetermined criteria and thus, it may be appropriate for further test signals to be sent with the test signals located at either edge of the radio frequency bandwidth. In some cases a further test signal towards a centre of the radio frequency bandwidth is sent. It may be at the most central location available for a physical resource block of one of the carriers, or it may be within 10%, preferably within 5% of the centre of the radio frequency bandwidth.

In some embodiments, said method further comprises controlling said signal generator to generate at least one further test signal, said at least one further test signal comprising a physical resource block of a carrier supported by said base station at a location towards one edge of said communication bandwidth.

As noted previously as the network node supports several carriers as well as NB IoT signals, so that transmitting additional signals within a test configuration to determine the effects of intermodulation distortions may be appropriate. Signals immediately adjacent to or close to a test signal at the edge of the radio frequency bandwidth may provide a challenging scenario with increased intermodulation distortions. In this regard where the test signal is a NB IoT test signal within the guard band then the further test signal may be located at an outermost location for a PRB in the communication band adjacent to that guard band. Alternatively, where the test signal is within the communication band then the further test signal may be at the next outermost location for a PRB or where the test signal is a NB IoT signal the further test signal may be immediately adjacent to it. In each of these cases the signals are close to each other within the spectrum and thus, provide an indication of potential interference and intermodulation distortions which may arise and affect the network node's ability to meet the predetermined criteria.

In some embodiments, the method further comprises controlling said signal generator to generate a plurality of said test signals as part of a set of test transmissions defined within a test configuration for determining whether said network node meets said predetermined criteria.

Each of the signals indicated provide their own challenges and test different requirements. They may be transmitted together or separately or there may be a test configuration or algorithm indicating a set of signals to be transmitted some together and some separately to test different issues.

In some embodiments said at least one radio frequency bandwidth comprises a signal reception bandwidth of said network node and said method further comprises controlling said signal generator to generate further interfering signals for transmission at a same time as said test signals.

The criteria that a network node needs to meet for compliance are relevant both to transmission and to reception. Where reception is concerned then the receiver on the network node needs to be able to receive the NB IoT signals wherever in the spectrum of the radio frequency bandwidth they are transmitted and in the presence of interfering signals. Thus, when testing the receiver in addition to the test signals towards the edge of the radio frequency bandwidth additional interfering signals are transmitted and the ability of the receiver to receive and decode the test signals in the presence of such interference is tested.

In some embodiments said at least one radio frequency bandwidth comprises a signal transmission bandwidth of said network node.

In addition to a reception radio frequency bandwidth the network node will be configured to transmit within a transmission radio frequency bandwidth which will be different to the reception bandwidth to reduce interference between transmitted and received signals. The transmission bandwidth has to meet predetermined criteria in order for the network node to comply with certain requirements and these generally relate to leakage to neighbouring bandwidths which might affect the operation of other network nodes.

In order to avoid or at least reduce leakage of signals into neighbouring frequency bands the network node has a transmit filter that reduces the transmission of signals outside the operating bandwidth. For signals towards the edge of the radio frequency bandwidth this filter requires a steeper roll off and thus, these are the signals that are the most challenging when the criteria are to be met. Thus, selecting test signals at or close to an edge of the operating bandwidth allows the leakage of signals into adjacent channels to be tested for challenging operating conditions.

When testing the transmission radio frequency bandwidth in some embodiments the method further comprises controlling said signal generator to boost a power level of at least one of said test signals with respect to other signals output by said network node.

In order to make the test signal more challenging it may have its power boosted, as this potentially increases leakage to neighbouring channels. The NB IoT test signal may be the signal that is selected for boosted power as where such a boosted power signal meets the requirements for compliance it is likely that the network node is able to operate across its radio frequency bandwidth while meeting the criteria. It should be noted that generally when transmitting a base station will split its power between the signals it is transmitting. Boosting the power of one test signal allows a challenging test to be performed.

The multiple carriers supported by the network node may include at at least two of: an E-UTRA carrier band and a GERAN band.

A second aspect of the present invention provides a computer program operable when executed by a processor to perform a method according to a first aspect of the present invention.

A third aspect of the present invention provides a device for generating wireless test signals for use in testing a network node operable to transmit Narrowband Internet of Things signals and supporting multiple carriers for compliance with predetermined criteria, said device comprising: a signal generator for generating wireless signals within at least one radio frequency bandwidth of said network node; a signal transmitter for transmitting said generated signals; and control logic for controlling said signal generator to generate one test signal in a frequency band towards one edge of one of said at least one radio frequency bandwidth and to generate at least one further test signal in a frequency band towards the other edge of said same one of said at least one radio frequency bandwidth, said one test signal comprising a Narrowband Internet of Things test signal.

In some embodiments said device comprises said network node, said network node further comprising a signal receiver for receiving wireless signals.

Where the transmission of the network node is being tested then the network node itself will generate the test signals, whereas when the reception is being tested a separate device will generate the test signals which the network node whose reception is being tested will receive.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Before discussing the embodiments in any more detail, first an overview will be provided.

Three NB-IoT operation modes have been specified in 3GPP, namely (ref. R4-164452):

1) NB-IoT In-band operation: NB-IoT is operating in-band when it utilizes the resource block(s) within a normal E-UTRA carrier 2) NB-IoT guard band operation: NB-IoT is operating in guard band when it utilizes the unused resource block(s) within an E-UTRA carrier's guard-band.

3) NB-IoT standalone operation: NB-IoT is operating standalone when it utilizes its own spectrum, for example the spectrum currently being used by GERAN systems as a replacement of one or more GSM carriers, as well as scattered spectrum for potential IoT deployment.

These three deployments mean that NB IoT signals may be sent at any location within the radio frequency spectrum of a base station that supports multiple carriers. Testing the base station to ensure that it meets compliance requirements for base stations configured to transmit and receive these signals therefore should be done with the whole bandwidth taken into account. Testing algorithms using different testing configurations are proposed which develop worst case or near worst case test signal scenarios to effectively test the base station's compliance. Using such scenarios reduces the number of different signals required to effectively test the base station. Signals towards the edge of the radio frequency bandwidth are used to generate these challenging test cases and in some configurations these signals are power boosted. The signals may in some embodiments be sent in-band, that is within the communication bandwidth of the base station and/or in others they may be sent in the guard band of the base station depending on what is to be tested.

For in-band and guard-band operation, one NB-IoT BS test configuration comprises a power boosted NB-IoT PRB placed as the outermost PRB in the TC (test configuration) at one or both edges of the BS RF bandwidth. In so-called stand-alone operation where the base station uses its own spectrum, that is, for example, the spectrum currently being used by GSM or GERAN signals a power boosted NB IoT signal is in one embodiment placed towards the edge of the radio frequency bandwidth.

In addition to testing signals on their own the effects of intermodulation distortion may also be tested and in this case additional test signals are sent. Thus, in some cases a NB IoT signal is sent towards one edge along with a wider band test signal, generally a PRB of one of the carriers supported by the base station either at the other edge or adjacent to the test signal or towards the centre of the radio frequency bandwidth depending on the testing algorithm.

Each set of signals comprises a test configuration for testing different aspects and these may be used individually or as a set according to the requirements to be tested.

Where the transmission of the base station is being tested the leakage into neighbouring bandwidths needs limiting and thus, it is this that is measured when the signals of the different test configurations are being transmitted. When the receiver of the base station is being tested then it is the ability of the filter at the receiver to receive signals towards the edge of the bandwidth that is tested along with its ability to decode in the presence of interference signals. Thus for the receiver compliance testing, in addition to the test signals of the test configurations shown, additional interference signals are added to the test configuration (not shown).

Each NB-IoT carrier is 180 kHz wide, and consists of twelve 15 kHz or forty-eight 3.75 kHz tones. In order to support enhanced downlink coverage for NB-IoT, it is specified in 3GPP RAN4 (ref. R4-164452) that NB-IoT BS should support at least 6 dB power boosting for a Physical Resource Block (PRB) of LTE carrier in-band or 180 kHz in guard band (for E-UTRA channel bandwidth larger than or equal to 5 MHz), comparing to the average power over all carriers (both E-UTRA and NB-IoT). Thus, the in-band test signals have a width of 180 kHz and may be power boosted by 6 dB. The width of the test signals may be less than 180 KHz where the signal is in the guard band and the guard band is narrow.

With the narrower bandwidth (180 kHz) and power boosting (6 dB) of the NB-IoT carrier, it is anticipated that the Power Spectral Density (PSD) of the NB-IoT carrier will be higher than the remaining E-UTRA carriers. A higher PSD carrier at the edge of the BS Radio Frequency (RF) bandwidth in the test configurations generally represents a more demanding TC for emission tests (e.g. operating band unwanted emissions), as the RF transmit filter design will need to provide a steeper roll-off to meet the emission requirements adjacent to the RF bandwidth edge.

Therefore, it is proposed to define the NB-IoT BS TC with the (power boosted for in-band or guard-band operation) of the NB-IoT carrier placed as the outermost carrier at one or both edges the BS RF bandwidth. Several of the test configurations of embodiments are described below.

Figure 1:
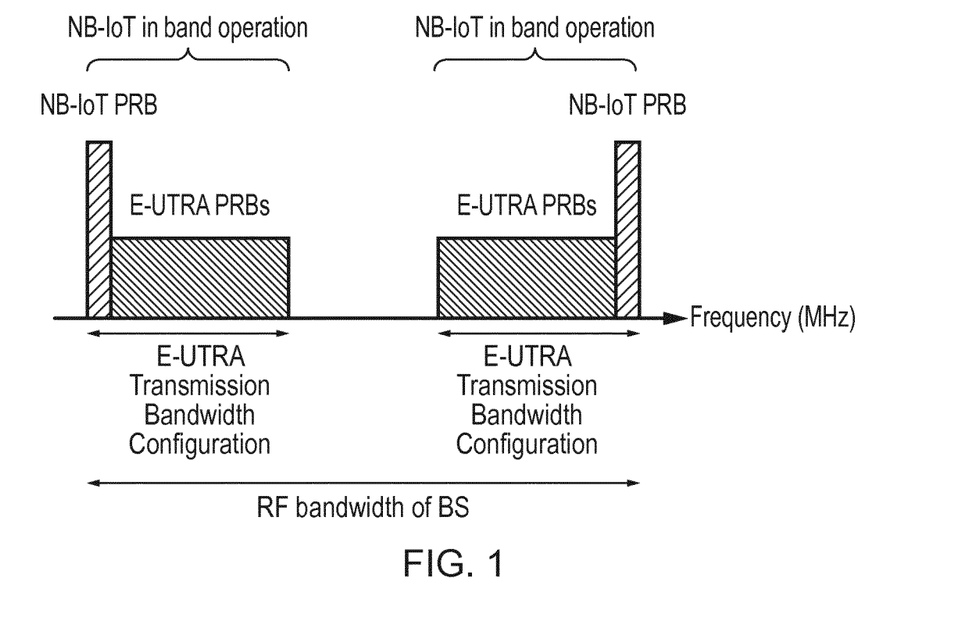
FIG. 1 illustrates one test configuration comprising two power boosted in-band NB-IoT PRB placed at either edge of the BS RF communication bandwidth, with a E-UTRA physical resource block placed adjacent to each of them.

In one embodiment, one powered boosted in-band NB-IoT (narrow band Internet of Things) PRB (physical resource block) is placed at one edge of the BS RF (base station radio frequency) bandwidth, while one powered boosted in-band NB-IoT E-UTRA is placed at the other edge of the BS RF bandwidth. This is shown in FIG. 1.

Figure 2:
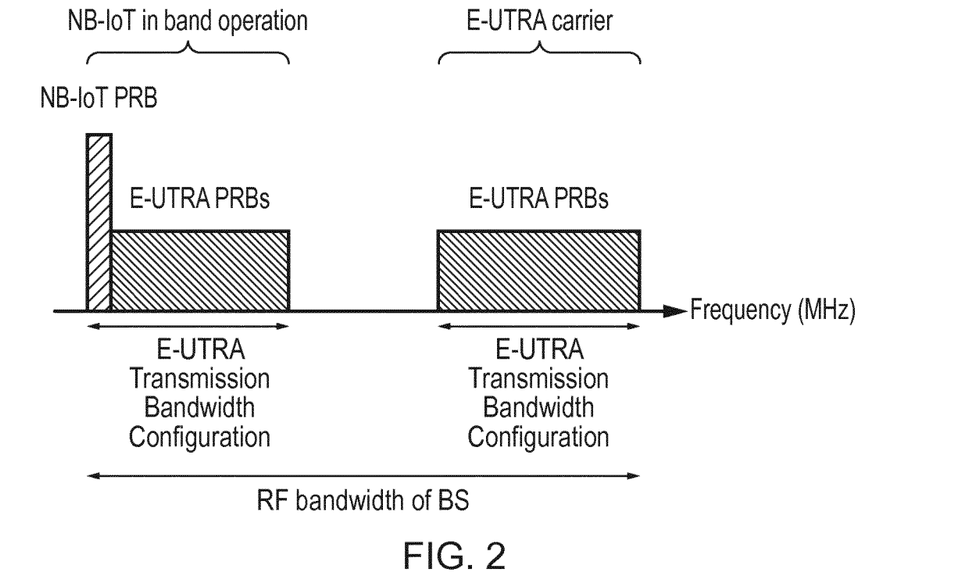
FIG. 2 illustrates one test configuration comprising a power boosted in-band NB-IoT PRB placed at one edge of the BS RF communication bandwidth with a E-UTRA carrier placed adjacent to it and at the other edge of the BS RF bandwidth.

In one embodiment, one powered boosted in-band NB-IoT PRB is placed at one edge of the BS RF bandwidth, while one or more E-UTRA carrier is(are) placed at the other edge of the BS RF bandwidth. This is shown in FIG. 2.

Figure 3:
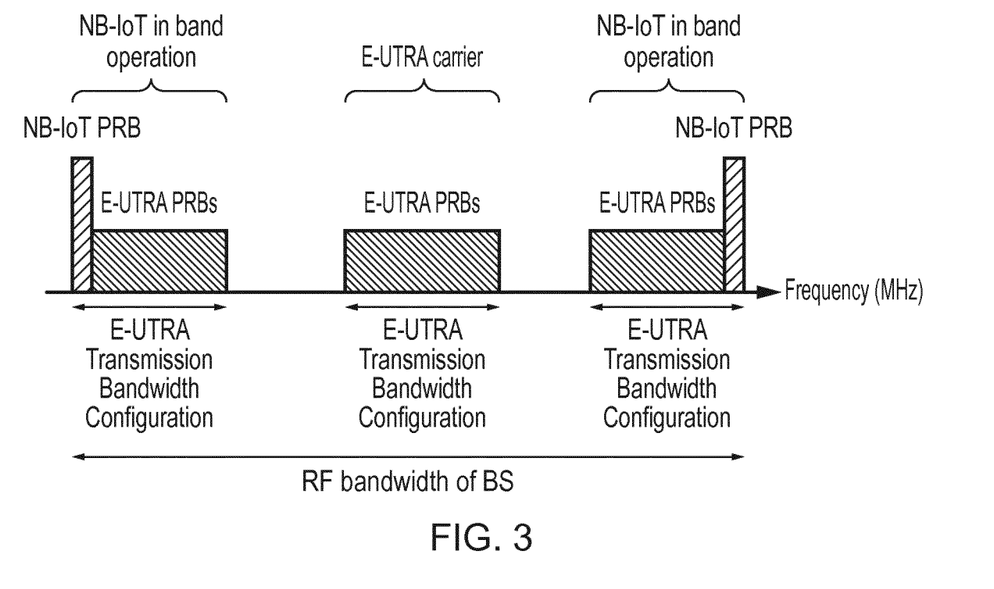
FIG. 3 shows one test configuration comprising power boosted in-band NB-IoT PRBs placed at each edge of the BS RF bandwidth, while one or more E-UTRA carrier is(are) placed in the middle of the BS RF bandwidth.

In one embodiment, one powered boosted in-band NB-IoT PRB is placed at each edge of the BS RF bandwidth, while one or more E-UTRA carrier is(are) placed in the middle of the BS RF bandwidth. This is shown in FIG. 3.

Figure 4:
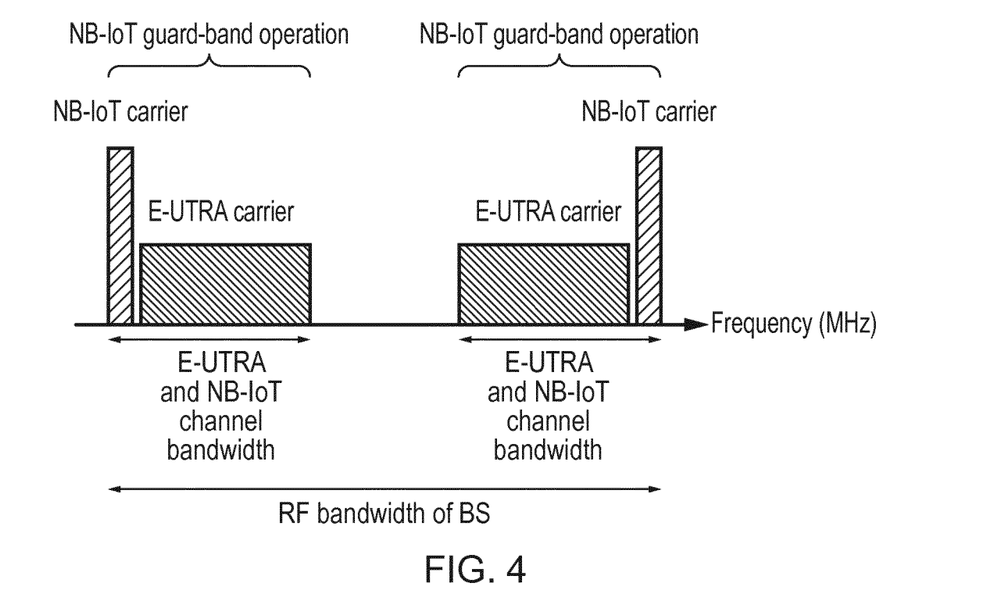
FIG. 4 shows one test configuration comprising a power boosted guard-band NB-IoT carrier placed at each edge of the BS RF bandwidth, with E-UTRA carrier PRB placed at each communication edge of the bandwidth.

In one embodiment, one powered boosted guard-band NB-IoT carrier is placed at one edge of the BS RF bandwidth, while one or more powered boosted guard-band NB-IoT carrier is (are) placed at the other edge of the BS RF bandwidth. This is shown in FIG. 4.

Figure 5:
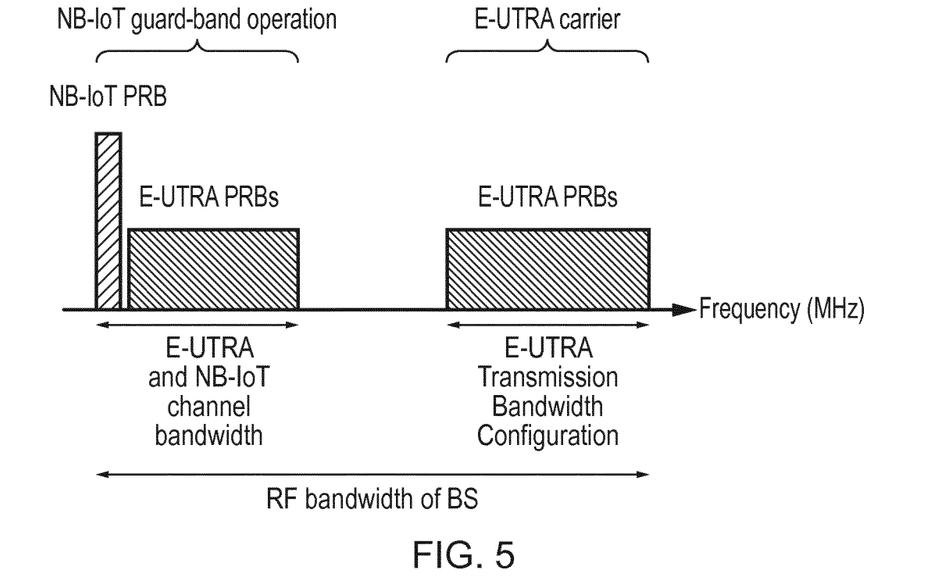
FIG. 5 illustrates one test configuration comprising one power boosted guard-band NB-IoT carrier is placed at one edge of the BS RF bandwidth, while one or more E-UTRA carrier is(are) placed at the other edge of the BS RF bandwidth.

In one embodiment, one powered boosted guard-band NB-IoT carrier is placed at one edge of the BS RF bandwidth, while one or more E-UTRA carrier is(are) placed at the other edge of the BS RF bandwidth. This is shown in FIG. 5.

Figure 6:
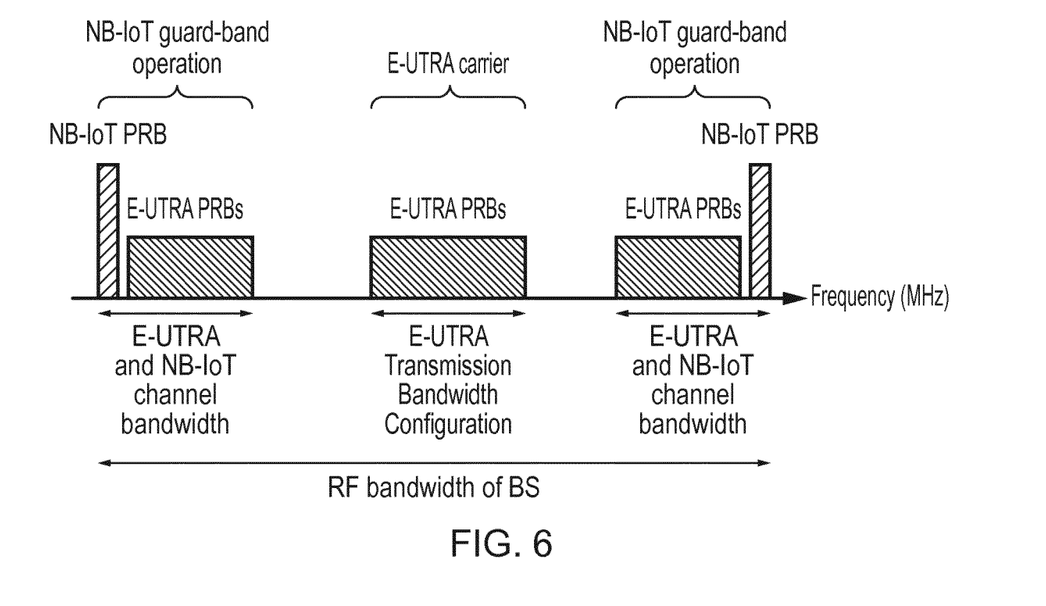
FIG. 6 illustrates one test configuration comprising one power boosted guard-band NB-IoT carrier placed at each edge of the BS RF bandwidth, while one or more E-UTRA carrier is(are) placed in the middle of the BS RF bandwidth.

In one embodiment, one powered boosted guard-band NB-IoT carrier is placed at each edge of the BS RF bandwidth, while one or more E-UTRA carrier is(are) placed in the middle of the BS RF bandwidth. This is shown in FIG. 6.

Figure 7:
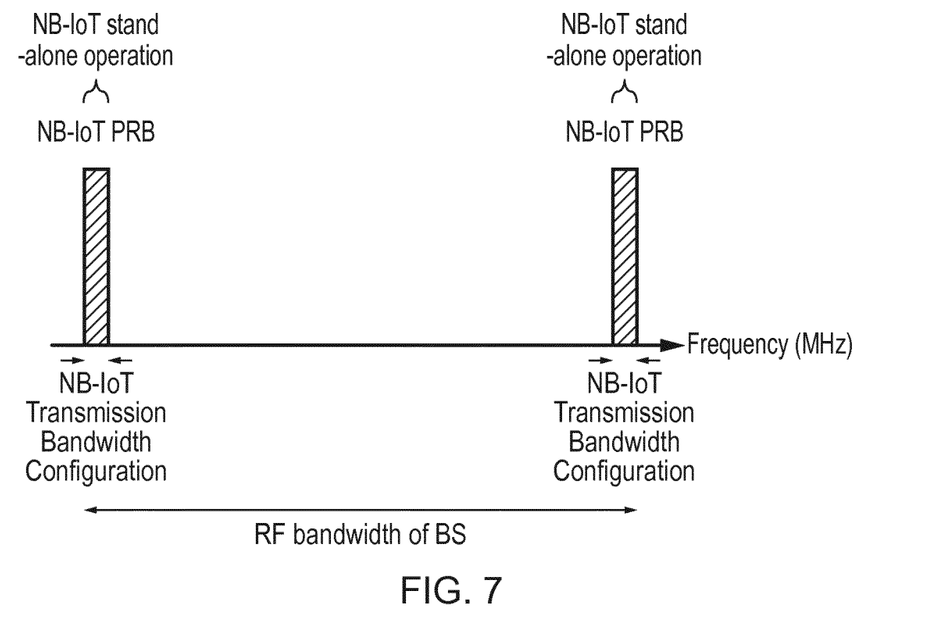
FIG. 7 illustrates one test configuration comprising one stand-alone NB-IoT carrier placed at one edge of the BS RF bandwidth, while one or more stand-alone NB-IoT carrier is(are) placed at the other edge of the BS RF bandwidth.

In one embodiment, one stand-alone NB-IoT carrier is placed at one edge of the BS RF bandwidth which may be in the spectrum previously used by GSM, while one or more stand-alone NB-IoT carrier is(are) placed at the other edge of the BS RF bandwidth. This is shown in FIG. 7.

Figure 8:
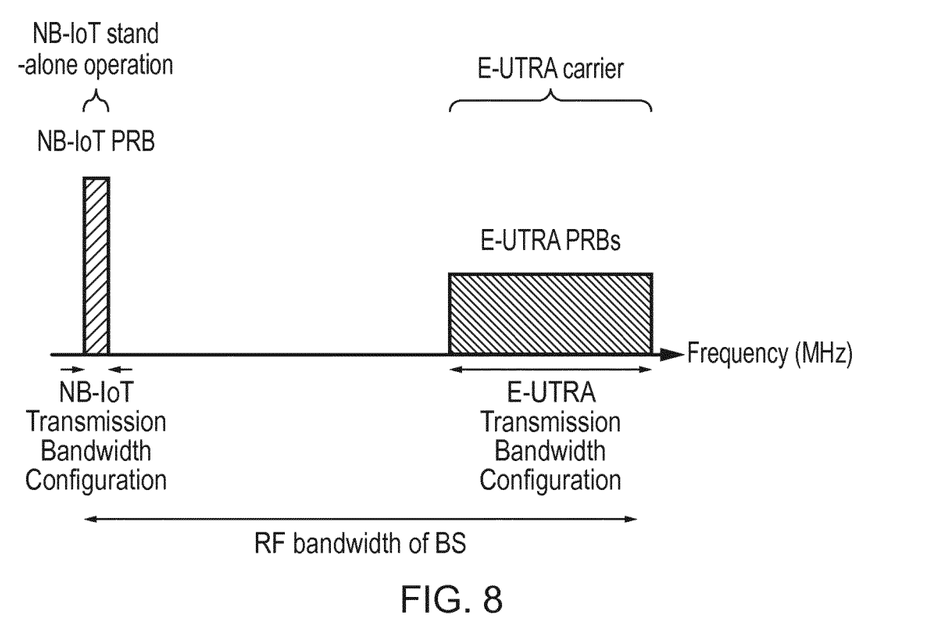
FIG. 8 illustrates one test configuration comprising one stand-alone NB-IoT carrier placed at one edge of the BS RF bandwidth, while one or more E-UTRA carrier is(are) placed at the other edge of the BS RF bandwidth.

In one embodiment, one stand-alone NB-IoT carrier is placed at one edge of the BS RF bandwidth, while one or more E-UTRA carrier is(are) placed at the other edge of the BS RF bandwidth. This is shown in FIG. 8.

Figure 9:
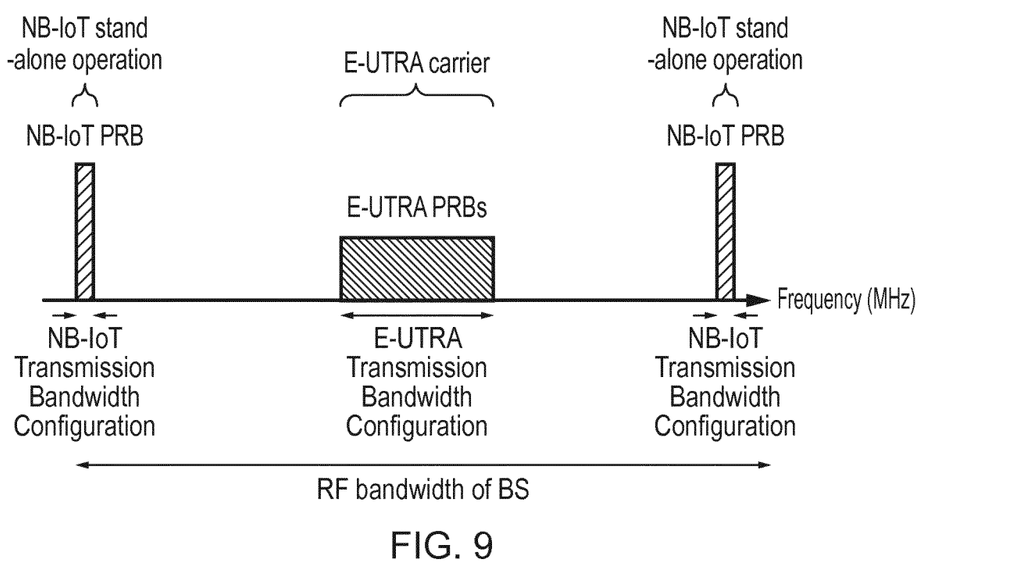
FIG. 9 illustrates one test configuration comprising one stand-alone NB-IoT carrier is placed at each edge of the BS RF bandwidth, while one or more E-UTRA carrier is(are) placed in the middle of the BS RF bandwidth.

In one embodiment, one stand-alone NB-IoT carrier is placed at each edge of the BS RF bandwidth, while one or more E-UTRA carrier is(are) placed in the middle of the BS RF bandwidth. This is shown in FIG. 9.

Figure 10:
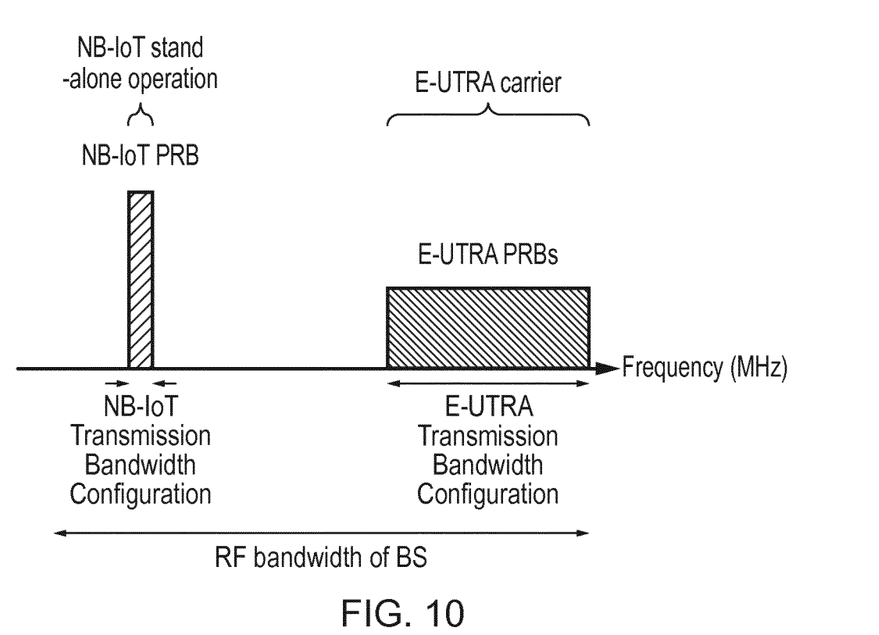
FIG. 10 illustrates one test configuration comprising one or more stand-alone NB-IoT carrier is(are) placed as the outermost carrier at one edge of the BS RF bandwidth, while one or more E-UTRA carrier is(are) placed at the other edge of the BS RF bandwidth.

In one embodiment, one or more stand-alone NB-IoT carrier is(are) placed as the outermost carrier at one edge of the BS RF bandwidth, while one or more E-UTRA carrier is(are) placed at the other edge of the BS RF bandwidth. This is shown in FIG. 10. This test configuration verifies the BS performance in practical deployment where the configured BW is less than the maximum supported bandwidth.

As can be seen a number of different test configurations are shown which test different aspects of a base station which supports multiple carriers and NB IoT signals. In general a NB IoT test signal is transmitted towards an edge of the RF bandwidth of the base station, this may be transmitted in combination with another test signal at the other edge of the RF bandwidth such as a further NB IoT signal or in conjunction with other signals that the base station is operable to transmit or receive to test different aspects of the base station and in some cases to trigger intermodulation distortions or interference with the test signal. These test configurations test different aspects and may be used as a set of test configurations performed one after the other to test a set of compliance requirements of the base station.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of generating wireless signals for testing a network node which supports Narrow Band Internet of Things signals, for compliance with predetermined criteria, said network node being configured to support multiple carriers and to support operation within at least one radio frequency bandwidth, said method comprising:
    generating a test signal in a frequency band towards one edge of one of said at least one radio frequency bandwidth; and
    generating one further test signal in a frequency band towards the other edge of said same one of said at least one radio frequency bandwidth, said one test signal comprising a Narrowband Internet of Things test signal.

2. The method according to claim 1, wherein said one further test signal comprises one of a Narrowband Internet of Things test signal and a test signal comprising a physical resource block of one of said plurality of carriers supported by said network node.

3. The method according to claim 1, wherein said at least one radio frequency bandwidth comprises a communication bandwidth and a guard bandwidth at either edge of said communication bandwidth and said frequency band towards one edge of said one of said at least one radio frequency bandwidth is within one of said guard bands.

4. The method according to claim 3, wherein said one of said test signals and said further one of said test signals are each within a different one of said guard bands.

5. The method according to claim 1, wherein said at least one radio frequency bandwidth comprises a communication bandwidth and a guard bandwidth at either side of said communication bandwidth, and at least one of said test signals is in a frequency band towards at least one edge of said communication bandwidth.

6. The method according to claim 5, wherein said frequency band towards said at least one edge of said communication bandwidth corresponds to an outermost location for a physical resource block in said communication bandwidth.

7. The method according to claim 1, comprising generating a further test signal, said further test signal comprising a physical resource block of a carrier supported by said base station at a location towards a centre of said at least one radio frequency bandwidth.

8. The method according to claim 1, wherein said one of said at least one radio frequency bandwidth comprises a communication bandwidth and a guard bandwidth at either side of said communication bandwidth, said method comprising generating at least one further test signal, said at least one further test signal comprising a physical resource block of a carrier supported by said base station at a location towards one edge of said communication bandwidth.

9. The method according to claim 1, comprising generating a plurality of said test signals as part of a set of test transmissions defined as test configurations for determining whether said network node meets said predetermined criteria.

10. The method according to claim 1, wherein said at least one radio frequency bandwidth comprises a signal reception bandwidth of said network node and said method further comprises generating further interfering signals for transmission at a same time as said test signals.

11. The method according to claim 1, wherein said at least one radio frequency bandwidth comprises a signal transmission bandwidth of said network node.

12. The method according to claim 11, further comprising boosting a power level of at least one of said test signals with respect to other signals output by said network node.

13. A non-transitory computer readable medium comprising computer instructions for performing at least the method according to claim 1.

14. A device for generating wireless test signals for use in testing a network node operable to transmit Narrowband Internet of Things signals and supporting multiple carriers for compliance with predetermined criteria, said device comprising:
at least one processor; and
at least one memory including computer program code, the at least one memory and computer program code configured to, with the at least one processor, cause the device to at least:
generate wireless signals within at least one radio frequency bandwidth of said network node; and
transmit said generated signals; and
wherein said generating wireless signals at least comprises generating one test signal in a frequency band towards one edge of one of said at least one radio frequency bandwidth and generating at least one further test signal in a frequency band towards the other edge of said same one of said at least one radio frequency bandwidth, said one test signal comprising a Narrowband Internet of Things test signal.

15. The device according to claim 14, wherein said device comprises said network node, said network node further comprising a signal receiver for receiving wireless signals.

16. The device of claim 14 comprising:
a transmitter wherein said at least one memory and computer program code are configured to, with said at least one processor, at least control said transmitter to transmit said generated signals.

17. The device according to claim 14, wherein said one further test signal comprises one of a Narrowband Internet of Things test signal and a test signal comprising a physical resource block of one of said plurality of carriers supported by said network node.

18. The device according to claim 14, wherein said at least one radio frequency bandwidth comprises a communication bandwidth and a guard bandwidth at either edge of said communication bandwidth and said frequency band towards one edge of said one of said at least one radio frequency bandwidth is within one of said guard bands.

19. The device according to claim 18, wherein said one of said test signals and said further one of said test signals are each within a different one of said guard bands.

20. The device according to claim 14, wherein said at least one radio frequency bandwidth comprises a signal transmission bandwidth of said network node.

21. The device according to claim 20, wherein said at least one memory and computer program code are configured to control the device to boost a power level of at least one of said test signals with respect to other signals output by said network node.

22. The device according to claim 14 wherein said network node comprises a base station.

* * * * *